United States Patent [19]
Speckhart et al.

[11] Patent Number: 5,299,134
[45] Date of Patent: Mar. 29, 1994

[54] COMPUTER CONTROL SYSTEM AND METHOD FOR SCANNING AND LOADING ARTICLES ON A CONVEYOR

[75] Inventors: Bernard Speckhart, Short Hills, N.J.; Craig Davidson, Cardiff by the Sea, Calif.; Paul M. Berson, Mountain Lakes, N.J.

[73] Assignee: White Conveyors, Inc., Kenilworth, N.J.

[21] Appl. No.: 643,780

[22] Filed: Jan. 22, 1991

[51] Int. Cl.$^5$ .................................. G06F 15/46
[52] U.S. Cl. .................................. 364/478; 198/349.95; 198/678.1; 209/937; 414/273; 414/331; 235/375
[58] Field of Search .................. 364/478, 479; 198/349.95, 680, 678.1, 465.4, 464.2; 211/115; 209/937; 414/331, 273, 274; 235/375, 385

[56] References Cited

U.S. PATENT DOCUMENTS

| | | |
|---|---|---|
| 1,217,986 | 3/1917 | Parce . |
| 1,217,987 | 3/1917 | Parce . |
| 1,217,988 | 3/1917 | Parce . |
| 1,247,535 | 11/1917 | Huddleston . |
| 1,597,527 | 8/1926 | Lane . |
| 1,808,405 | 6/1931 | Hurd . |
| 1,808,406 | 6/1931 | Gammell . |
| 1,813,229 | 7/1931 | Constable . |
| 1,816,331 | 7/1931 | Kruschwitz . |
| 1,823,773 | 9/1931 | Troy . |
| 1,902,088 | 3/1933 | Maurer . |
| 2,000,404 | 5/1935 | Maul ........................... 209/111 |
| 2,362,683 | 11/1944 | Weinberg ..................... 209/80 |
| 2,645,186 | 7/1953 | Davis ........................... 104/97 |
| 2,708,501 | 5/1955 | Boehm ......................... 198/27 |
| 2,750,897 | 6/1956 | Davis ........................... 104/96 |
| 2,868,354 | 1/1959 | Harrison ....................... 198/177 |
| 2,916,132 | 12/1959 | Leiser ........................... 198/21 |
| 2,918,164 | 12/1959 | Austin et al. ................. 198/177 |
| 2,989,181 | 6/1961 | Dickinson ..................... 209/111 |
| 2,993,595 | 7/1961 | Dickinson et al. ........... 209/111.5 |
| 3,075,653 | 1/1963 | Wales et al. ................. 214/11 |
| 3,113,659 | 12/1963 | Oda et al. .................... 198/25 |
| 3,152,682 | 10/1964 | Rutkovsky et al. .......... 198/38 |

(List continued on next page.)

FOREIGN PATENT DOCUMENTS

| | | | |
|---|---|---|---|
| 730287 | 3/1196 | Canada ........................... | 340/30 |
| 1004625 | 2/1977 | Canada ........................... | 203/18 |

OTHER PUBLICATIONS

Master-Veyor brochure, published by Speed Check Conveyor Co. Inc., Decatur, Ga., pp. 1-4; Date Unknown.

Sorting Carousel brochure, published by Dunnewolt U.S.A. Inc., Dallas, Tex., pp. 1-4; Date Unknown.

(List continued on next page.)

Primary Examiner—Joseph Ruggiero
Attorney, Agent, or Firm—Kenyon & Kenyon

[57] ABSTRACT

A system and method and loading articles onto a sorting conveyor. An exemplary embodiment of the system includes a computer processor to control system function, a scanning device for identifying articles to be sorted, a conveyor for transporting articles loaded thereon, and a loading device for accomplishing the physical loading of articles onto the conveyor. The computer processor controls the motion of the conveyor, receives information from the scanning and loading devices and builds a database therewith useful for sorting the articles loaded onto the second conveyor. An exemplary method concerns conveying a sequence of one or more articles to be sorted; scanning the articles in the sequence with a scanning system to determine the identification of the articles; communicating the identification of the scanned articles from the scanning system to a processor; storing in memory article identification information; communicating commands from the processor to a loading device to effect the loading of articles onto a conveyor, each article being loaded at a conveyor location; communicating conveyor position information from the loading device to the processor; and storing in memory the location at which an identified article is loaded on the conveyor and associating with the location the identification of the loaded article.

37 Claims, 3 Drawing Sheets

U.S. PATENT DOCUMENTS

| | | | |
|---|---|---|---|
| 3,184,042 | 5/1965 | Rutkovsky et al. | 198/177 |
| 3,550,751 | 12/1970 | Jack, Jr. | 198/38 |
| 3,564,271 | 2/1971 | Nearman | 250/223 |
| 3,612,250 | 10/1971 | Thompson et al. | 198/38 |
| 3,696,946 | 10/1972 | Hunter et al. | 214/11 R |
| 3,799,318 | 3/1974 | Dekoekkoek | 198/26 |
| 3,840,103 | 10/1974 | Willis | 194/4 R |
| 3,880,298 | 4/1975 | Habegger et al. | 214/11 R |
| 3,917,112 | 11/1975 | Willis et al. | 221/1 |
| 4,022,338 | 5/1977 | Laursen | 214/89 |
| 4,114,538 | 9/1978 | Nicodemus, Jr. et al. | 104/88 |
| 4,239,435 | 12/1980 | Weiss et al. | 414/136 |
| 4,484,288 | 11/1984 | Riemenschneider | 364/478 |
| 4,618,932 | 10/1986 | Sauer | 364/478 |
| 4,983,091 | 1/1991 | Lichti, Sr. et al. | 364/478 X |
| 4,991,719 | 2/1991 | Butcher et al. | 364/478 X |
| 5,058,750 | 10/1991 | Graese | 209/937 X |
| 5,072,822 | 12/1991 | Smith | 209/937 X |

OTHER PUBLICATIONS

My-T-Veyor brochure, Model No. 830. Published by My-T-Veyor, Oxford, Mich., pp. 1–3; Date Unknown.

Sort-O-Veyor brochure, published by Speed Check Conveyor Co., Inc., Decatur, Ga., pp. 1–4; Date Unknown.

Quick Assembly brochure, published by Natmar, Inc., Cincinatti, Ohio, pp. 1–2; Date Unknown.

Controlling Hospital Garments, Wim Giezeman, Textile Rental, Jun. 1982 pp. 34–36, 38.

Declaration of Craig Davidson and attached Exhibits A, B and C. Filed Dec. 26, 1991.

COMPUTER CONTROL SYSTEM AND METHOD FOR SCANNING AND LOADING ARTICLES ON A CONVEYOR

FIELD OF THE INVENTION

The present invention relates to the field of sorting a collection of randomly arranged articles into a desired order and, in particular, to the identifying and loading of articles, such as garments supported on hangers, onto a sorting conveyor.

BACKGROUND OF THE INVENTION

When sorting a collection of articles is desired, a sorting conveyor can be used to accomplish the task. A sorting conveyor is a circular, rectangular, or other shape endless chain or line having associated with it one or more loading stations where articles to be sorted are placed onto the conveyor and one or more drop stations where articles are deposited into sorted groups.

Loading the sorting conveyor with articles to be sorted involves moving the conveyor past a loading station. At the loading station, such articles to be sorted (the "unsorted sequence") are placed, one by one, onto the sorting conveyor at discrete points along its length. The sorting conveyor can be loaded with articles in any unsorted order.

The sorting of articles is accomplished by moving the loaded conveyor past a drop station which selects certain articles from the conveyor in a specified order. In this way, an unsorted sequence of articles loaded on the sorting conveyor can be converted into a sorted sequence at one or more drop stations.

In order to sort a collection of unsorted articles using a sorting conveyor, it is necessary to determine the identity of each article. Furthermore, unsorted articles must be loaded onto the sorting conveyor and their identities must be associated with locations on the sorting conveyor.

Identifying and loading each article in an unsorted sequence of articles can be a manual-labor intensive task. Determining and recording an article's identification may be performed by one or more operators by hand. Once identified, each article may be loaded by hand in some fashion onto the sorting conveyor. These manual labor-intensive aspects of identifying and loading articles create a bottle-neck, slowing the overall process undesirably.

SUMMARY OF THE INVENTION

The present invention provides a computer control system for automatic article identification and loading onto a sorting conveyor. The system operates by controlling a conveyor which carries articles to be sorted, identifying each article, and loading the identified articles onto a sorting conveyor. For identifying each article in the unsorted sequence, the system uses an automatic scanning system. As each article moves past the scanning system, identification information associated with (e.g., attached to) the article is read. This information is passed on to a control processor of the present invention which stores the information in its memory. The articles to be sorted proceed to a computer controlled automatic loader which, in response to commands from the control processor, loads each identified article onto a moveable sorting conveyor. The sorting conveyor has discrete points along its length adapted to receive articles from the automatic loader (loading points). The position of these discrete loading points relative to the automatic loader is determined by sensors on the loader. The automatic loader communicates this sensor information to the control processor which uses the information to keep track of the location of each identified article loaded on the sorting conveyor and to advance the sorting conveyor to allow for the loading of succeeding articles in the sequence.

Using article identification information from the scanning system and sorting conveyor position information from the automatic loader, the control processor controls the scanning and loading process and builds a database with the identity of each article of the unsorted sequence and the location of each article on the sorting conveyor. With the sorting conveyor loaded and the database built, a sorting process of the loaded articles can occur.

DETAILED DESCRIPTION OF THE INVENTION

Figure 1:
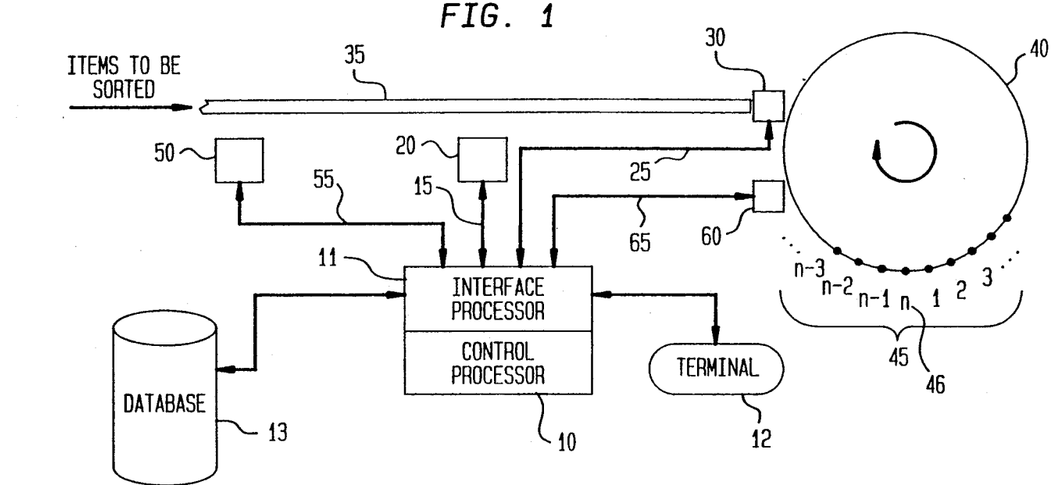
FIG. 1 depicts the present invention in an exemplary embodiment.

FIG. 1 presents an exemplary embodiment of the present invention. A control processor 10 is coupled to a scanning system 20 via data interconnect 15. The control processor 10 is also connected to an automatic loading device 30 via data interconnect 25. An embodiment of the present invention can include an interface processor coupled to the control processor 10 and the data interconnects 15 and 25 (and 55 and 65, see below), to provide a user interface to the system to control the system's overall operation from a workstation or terminal 12 and to provide for system reporting functions. The interface processor 11 can also provide an interface to a database 13 to store and retrieve relevant data concerning article identification and sorting conveyor addresses for loaded and identified articles. The present invention does not require an interface processor 11, as the functions of the interface processor 11 can be accomplished by the control processor 10. However, the embodiment which includes the interface processor 11 is preferred.

Articles which are ultimately to be sorted are provided on an unsorted sequence conveyor 35. The unsorted sequence conveyor 35 is driven by motor unit 50 under the control of control processor 10. Motor unit 50 is coupled to the control processor 10 via data interconnect 55 and interface processor 11. The unsorted sequence conveyor 35 is the recipient of a sequence of articles from a process which has left the articles unsorted (for example, if the articles are garments hung on hangers, the process by which the garments are laundered or dry-cleaned leaves the garments in an unsorted order). The articles on the unsorted sequence conveyor 35 (ART$_1$, where "i" denotes the any specific article in the unsorted sequence) are identifiable in sequence as ART$_1$, ART$_2$, ART$_3$, ..., ART$_m$, where "m" is the total number of articles such that ART$_m$ indicates the last article in the sequence (i.e., the ART index "i" can take on values 1 to "m"). The scanning system 20 is positioned adjacent to the unsorted sequence conveyor 35 so as to be able to effectively scan and thereby identify each article in the unsorted sequence.

Whenever an article transported by the unsorted sequence conveyor 35 passes the scanning system 20, the scanning system 20 scans the article to determine its article identification (AID). Each article bears scannable AID information identifying that article (AID$_i$, where "i" denotes any specific AID in the sequence of AIDs; the sequence of AIDs corresponds on a one to one basis with the sequence of ARTs). The scanning system 20, by scanning the AID on an article, converts the AID from its form on the article to a set of electrical signals representing a string of binary digits (bits). These AID bits are passed on to the control processor 10, via data interconnect 15 and interface processor 11, for pairing with a sorting conveyor address.

The automatic loading device 30 of the present invention receives articles one at a time from the unsorted sequence conveyor 35 and, under the control of the control processor 10, loads each article, ART$_1$, onto the sorting conveyor 40. The sorting conveyor 40 is driven by motor unit 60 under the control of control processor 10. Sorting conveyor motor unit 60 is coupled to control processor 10 via data interconnect 65 and interface processor 11. The sorting conveyor 40 is shown as a circular conveyor for simplicity; however, the sorting conveyor 40 may assume any shape so long as it is an unbroken chain or line.

Along the length of the sorting conveyor 40 are "loading points" (LPs) 45. The LPs 45 are discrete points along the length (or path) of the sorting conveyor 40 where unsorted articles can be loaded for later sorting. Each LP 45 has associated with it an address (or defined location) along the sorting conveyor 40. Each LP address (LP$_j$, where "j" denotes any specific LP address) is determined with respect to a reference point 46 (which may itself be a LP) on the sorting conveyor 40. A reference point 46 on the sorting conveyor 40 can be designated arbitrarily. Once designated, each LP address, LP$_j$, can be defined by its distance—for example, by the number of LPs 45 it is away—from the reference point.

For example, with reference to the sorting conveyor 40 shown in FIG. 1, any LP$_j$ 45 along the sorting conveyor 40 can be designated as the "end" or last LP address, identified by the designation "LP$_n$" (where "n" is the total number of loading point addresses on the sorting conveyor 40). This LP$_n$ serves as the reference point 46. Extending around the sorting conveyor 40 from the reference point 46 are LP$_j$s 45 which are identified by their distance, e.g., in loading point count, from the reference point 46. Assuming the sorting conveyor 40 moves in a clockwise direction when loading and sorting (from the perspective of looking down from above the sorting conveyor 40) and that there are "n" loading points including the reference point, LP$_j$s 45 beginning with the first one to the right of the reference point 46 are identified as LP$_1$, LP$_2$, LP$_3$, ..., LP$_{n-3}$, LP$_{n-2}$, LP$_{n-1}$, LP$_n$ (i.e., the LP index "j" can take on values 1 to "n"). Thus, the loading point addresses begin with LP$_1$, wrap around the sorting conveyor 40, and end with the reference point, LP$_n$. In this way, all discrete LP addresses, including the reference point, can be referenced by the control processor 10 of the present invention.

With the LP addresses defined, the control processor 10 keeps track of which LP address, LP$_j$, is currently at the automatic loading device 30 (i.e., which LP 45 is currently available to receive an article). This is done by advancing the sorting conveyor 40 to place at the automatic loading device 30 an LP address at which the loading of articles can begin (e.g., LP$_1$); by the control processor 10 initializing an LP address count (LPAC) with LP$_1$; and by the control processor 10 incrementing its LPAC each time sorting conveyor 40 movement, as commanded by the control processor 10, causes a succeeding LP 45 of the sorting conveyor 40 to be present at the automatic loading device 30.

When a scanned article, ART$_1$, reaches the automatic loading device 30 as a result of being transported by the unsorted sequence conveyor 35, the automatic loading device 30 indicates the arrival of the article (ART$_1$) to the control processor 10 via data interconnect 25 and interface processor 11. The control processor 10 then issues commands via interface processor 11 and data interconnect 25 to the automatic loading device 30 to load the article (ART$_1$) onto the sorting conveyor 40. The automatic loading device 30 responds by performing the load operation and by sending a signal that the load process is complete. The control processor 10, as a result of receiving an indication that the scanned article, ART$_1$, has been loaded onto the sorting conveyor 40, associates the AID of the article, AID$_1$ (received as a result of scanning), with the sorting conveyor loading point address where the article is located, LP$_j$, as maintained by the LPAC. This data—the AID$_1$ and LP$_j$ of a loaded article—is then stored in memory for subsequent use in the sorting of articles loaded on the sorting conveyor 40. The data can be stored in any memory available to the control processor, including random access memory or mass storage, such as a magnetic disk storage system 13.

During the loading of articles onto the sorting conveyor 40, the control processor 10 controls the movement of the sorting conveyor 40 via commands to the motor unit 60. This movement is typically one interloading point distance in length so as to bring the next available loading point to the automatic loading device 30. However, this movement can be for a distance of greater length. The automatic loading device 30 provides signals to the control processor 10 to indicate the arrival of a loading point as a result of sorting conveyor 40 movement.

Contemporaneously, the control processor 10 increments its LPAC to reflect the change in loading point address at the automatic loading device 30.

This process is repeated for each article to be loaded onto the sorting conveyor 40. In this way, the present invention builds a database of AIDs and LPs for all articles scanned and loaded on the sorting conveyor 40.

The Scanning System

The scanning system 20 of the present invention scans AID information on each article as it passes on the unsorted sequence conveyor 35. The scanning system 20 can be any of the types readily available. Among these scanning systems are magnetic strip readers (which can read AID information recorded on magnetic strips) and bar code readers (which can scan bar coded AID information imprinted on the article itself or on a label attached thereto). For sorting systems for garments on hangers, bar coded sorting systems are preferred.

Because of the need to scan articles loaded on the unsorted sequence conveyor 35, the scanning system 20 of the present invention is generally located adjacent to the unsorted sequence conveyor 35. However, the particular physical position of the scanning system 20 is constrained only by its need to read AID information off of articles.

Figure 2:
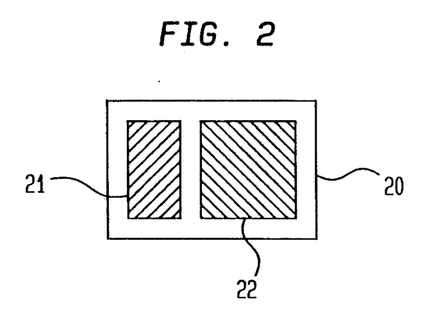
FIG. 2 depicts an exemplary embodiment of the scanning system of the present invention.

One embodiment of the scanning system 20, as shown in FIG. 2, has two sensors: an "electric eye" sensor 21 and a scanning sensor 22 (e.g., a bar code reader, such as model number MS-1200, manufactured by Microscan Systems, Inc., of Tuckwila, Wash.). The electric eye sensor 21 senses when an article is nearing the position to be scanned and transmits this event information, in the form of an ARTICLE PRESENT message, to the control processor 10. The scanning sensor 22 senses or "reads" the article identification information on the article and converts it into a string of bits, $AID_1$. The scanning sensor 22 also communicates the $AID_1$ information bits, in the form of an ARTICLE ID message, to the control processor 10. Should the scanning sensor 22 be unsuccessful at reading AID information bits, the scanning sensor will communicate the occurrence of this event with a BAD SCAN message rather than an ARTICLE ID message. The use of scanning system 20 information by the control processor 10 is discussed below.

Figure 2A:
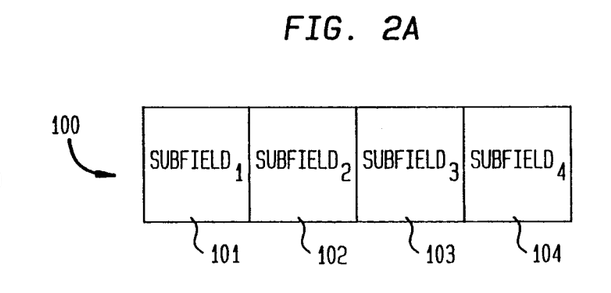
FIG. 2a depicts exemplary article identification information.

FIG. 2a is graphic representation of AID information read from an article, $ART_1$, and communicated to the control processor 10. The $AID_1$ information can be a single field of information bits or it can be logically sub-divided into a collection of sub-fields 100 as shown in the figure. Each sub-field 101-104 can represent something pertinent to a sort to be performed. For example, if the articles are laundered garments, a sort may be made according to "delivery route" —the number assigned to identify a route taken by a delivery driver when delivering laundered garments. Within a given route, it may be desireable to sort according to "customer account"—the number assigned to identify a customer in a given route to whom garments are to be delivered. For a given customer, it may be desirable to sort according to "garment wearer"—the number assigned to identify the person who wears the garment, typically an employee of the customer. For a given garment wearer, it may be desireable to sort according to "garment type"—the number assigned to differentiate one type of garment, for example, pants, from another type of garment, for example, shirts. Thus, as shown in FIG. 2a, the sub-fields have the following exemplary order: $SUB-FIELD_1$ 101 holds the delivery route number, $SUB-FIELD_2$ 102 holds the customer account number, $SUB-FIELD_3$ 103 holds the garment wearer identification number, and $SUB-FIELD_4$ 104 holds the garment type number.

Of course, this order of sub-fields is only exemplary; sub-fields may appear in any order in the AIDs of a group of articles, regardless of the order in which they will be considered when sorted by the control processor 10. That is, as long as the control processor is aware of the order of sub-fields in the AIDs of a group of articles, the sub-fields may appear in any order and the control processor 10 can, once such sub-fields are scanned, rearrange the order of sub-field information to accomplish sorting based on any order desired.

Regardless of whether an $AID_1$ comprises a single field or a plurality of sub-fields of information bits, the $AID_1$ identifies $ART_1$ for purposes of subsequent sorting. As described above, for example, two distinct articles, $ART_1$ and $ART_5$, may bear AIDs, $AID_1$ and $AID_5$, which are the same. This means that the two articles are interchangeable as far as sorting is concerned.

In any one embodiment of the present invention, it may be useful to include an additional sub-field, or extra bits, in an AID, to uniquely identify an article for all purposes (i.e., not merely for sorting). For example, doing so can allow for the tracing of individual articles or the recording of information unique to each article, such as an article's repair record or maintenance history.

The Sorting Conveyor

The sorting conveyor 40 of the present invention can be any conveyor known in the art. In the case of a conveyor system for sorting garments on hangers, an exemplary sorting conveyor is described in U.S. Pat. No. 4,239,435, issued on Dec. 16, 1980, and is hereby incorporated by reference as if set forth fully herein.

The sorting Conveyor Motor Unit

The sorting conveyor motor unit 60 includes the motor, for example an electric motor, for driving the sorting conveyor 40, a clutch drive system for engaging the motor and the sorting conveyor 40, and interface circuitry for receiving commands from the control processor 10. The commands to the sorting conveyor motor unit 60 allow the control processor 10 to start and stop the sorting conveyor 40 as needed. An exemplary set of commands to accomplish this control is as follows:

(1) CONVEYOR READY—This command from the control processor 10 to the sorting conveyor motor unit 60 causes the motor interface circuitry to place the motor in a slow speed (i.e., a motor speed suitable for accurately positioning a sorting conveyor 40 loading point at the automatic loading device 30) and to release the clutch (i.e., disengage the motor/sorting conveyor 40 drive linkage). This command leaves the sorting conveyor 40 motionless but ready to be moved at the slow motor speed.

(2) CONVEYOR SLOW—This command from the control processor 10 to the sorting conveyor motor unit 60 causes the motor interface circuitry to place the motor in a slow speed and engage the clutch (i.e., engage the motor/sorting conveyor 40 drive linkage). This command places the sorting conveyor 40 in motion at a slow speed.

(3) CONVEYOR FAST - This command from the control processor 10 to the sorting conveyor motor unit 60 causes the motor interface circuitry to place the motor in a fast speed (i.e., a speed suitable for moving the sorting conveyor 40 when accurate positioning of the sorting conveyor 40 relative to the automatic loading device 30 is not a concern) and engage the clutch. This command places the sorting conveyor 40 in motion at a fast speed.

(4) CONVEYOR STOP—This command from the control processor 10 to the sorting conveyor motor unit 60 causes the motor interface circuitry to stop the motor and to release the clutch. This command leaves the sorting conveyor 40 motionless.

The Unsorted Sequence Conveyor

The unsorted sequence conveyor 35 can be any motor driven conveyor system capable of delivering articles to the automatic loading device 30 for loading. In the case of a system for conveying garments on hangers, an exemplary unsorted sequence conveyor is described in co-pending U.S. Application Ser. No. 07/643,776, entitled "Apparatus For Conveying," filed on even date herewith, now U.S. Pat. No. 5,154,275, which has been assigned in common with the present application to White Conveyors, Inc., Kenilworth, N.J. and which is hereby incorporated by reference as if set forth fully herein. For purposes of its use with the present application, the unsorted sequence conveyor of the referenced co-pending application may terminate on a "slick rail." This slick rail is inclined such that hangers on which garments are hung slide by force of gravity from the end of the unsorted sequence conveyor 35 to the automatic loading device 30. This slick rail may be replaced by a powered conveyor between the unsorted sequence conveyor 35 and the automatic loading device 30. In the alternative, the slick rail (or a powered conveyor) may not be used at all, such that the unsorted sequence conveyor 35 terminates at the automatic loading device 30. For conveying garments, where the unsorted sequence conveyor 35 and the sorting conveyor 40 move hangers on which garments are hung, the slick rail embodiment is preferred.

The Unsorted Sequence Conveyor Motor Unit

The unsorted sequence conveyor motor unit 50 includes the motor, for example an electric motor, for driving the unsorted sequence conveyor 35 and interface circuitry for receiving commands from the control processor 10. The commands to the sorting conveyor motor unit 50 allow the control processor 10 to start and stop the unsorted sequence conveyor 35 as needed. An exemplary set of commands to accomplish this control is as follows:

)1) CONVEYOR START—This command from the control processor 10 to the unsorted sequence conveyor motor unit 50 causes the motor interface circuitry to start the motor to set the unsorted sequence conveyor 35 in motion to transport articles.

(2) CONVEYOR STOP—This command from the control processor 10 to the unsorted sequence conveyor motor unit 50 causes the motor interface circuitry to stop the motor. This command leaves the unsorted sequence conveyor 35 motionless.

The Automatic Loading Device

The automatic loading device 30 of the present invention accepts articles from the unsorted sequence conveyor 35 for loading onto the sorting conveyor 40. To do this, the automatic loading device 30 must report the occurrence of certain events to the control processor 10 and respond to certain control processor 10 commands. The events which must be reported to the control processor 10 are as follows:

(1) CONVEYOR IN POSITION—This event occurs each time a conveyor loading point is positioned at the automatic loading device 30. This event is used by the control processor 10 to keep track of loading point addresses, $LP_j$, as they move to or past the automatic loading device 30. It allows the control processor 10 to determine which $LP_j$ is present at the automatic loading device at any time. Signals of this event provide the information necessary to the control processor 10 to position any particular $LP_j$ of the sorting conveyor 40 at the automatic loading device 30. This event is reported by sensors on the automatic loading device 30 which sense the presence of each $LP_j$ as it arrives at the automatic loading device.

(2) ARTICLE AT LOADER - This event occurs whenever an article has been brought to the automatic loading device 30 and is in position for loading onto the sorting conveyor 40. This event triggers the control processor 10 to issue certain commands to the automatic loading device 30 (see, generally, LOAD ARTICLE and READY LOADING MECHANISM commands described below) which accomplish the loading of article $ART_1$. This event is reported by sensors on the automatic loading device 30 which sense the presence of article $ART_1$ when it arrives for loading.

(3) ARTICLE IN LOADING POSITION—This event occurs when, in response to a command to load an article ART (see discussion of LOAD ARTICLE command below), the automatic loading device 30 loading mechanism has moved to a position where it loads the article onto a LP on the sorting conveyor 40. This event is reported by sensors on the automatic loading device 30 which sense the movement of the loading mechanism.

(4) LOADING MECHANISM READY—This event occurs when, in response to a command from the control processor 10 (see discussion of READY LOADING MECHANISM below), the loading mechanism of the automatic loading device 30 returns from the position it was in loading an article $ART_1$ onto the sorting conveyor 40 (loading position) to a position at which it can receive the next article, $ART_{i+1}$, for loading. This event is reported by sensors on the automatic loading device 30 which sense the movement of the loading mechanism.

The configuration of an exemplary automatic loading device, including its loading mechanism, its sensors and their relationship to the sorting conveyor, is discussed in co-pending U.S. Application Ser. No. 07/643,435, entitled "Apparatus For Loading Articles," filed on even date herewith, now U.S. Pat. No. 5,141,094, which has been assigned in common with the present application to White Conveyors, Inc., Kenilworth, N.J. and which is hereby incorporated by reference as if set forth fully herein.

The automatic loading device 30 includes, among other things, interface circuitry for receiving commands from the control processor 10. The commands, each communicated as a string of bits, allow the control processor 10 to insert and retract the article loading mechanism of the automatic loading device 30. An exemplary set of commands to accomplish this control is as follows:

(1) LOAD ARTICLE—This command causes the loading mechanism of the automatic loading device 30 to move from its position where it receives an article for loading (ready position) to a position where it can load the article onto the sorting conveyor 40 (loading position).

(2) READY LOADING MECHANISM—This command causes the loading mechanism of the automatic loading device 30 to move from its loading position to its ready position so that it will be able to receive the next article for loading.

The Control Processor

The control processor 10 of the present invention receives event information and data from the scanning system 20 and the automatic loading device 30, and transmits commands for the operation of the unsorted sequence conveyor motor unit 50 and sorting conveyor motor unit 60 and the loading of articles onto the sorting conveyor 40 by the automatic loading device 30.

The control processor 10 hardware of the present invention is a microprocessor, but other computer processors will suffice to execute the software functions of the present invention. An exemplary microprocessor which can be used in the present invention is one made by the INMOS division of SGS Thompson, sold under the trademark "IMS T400".

Figure 3:
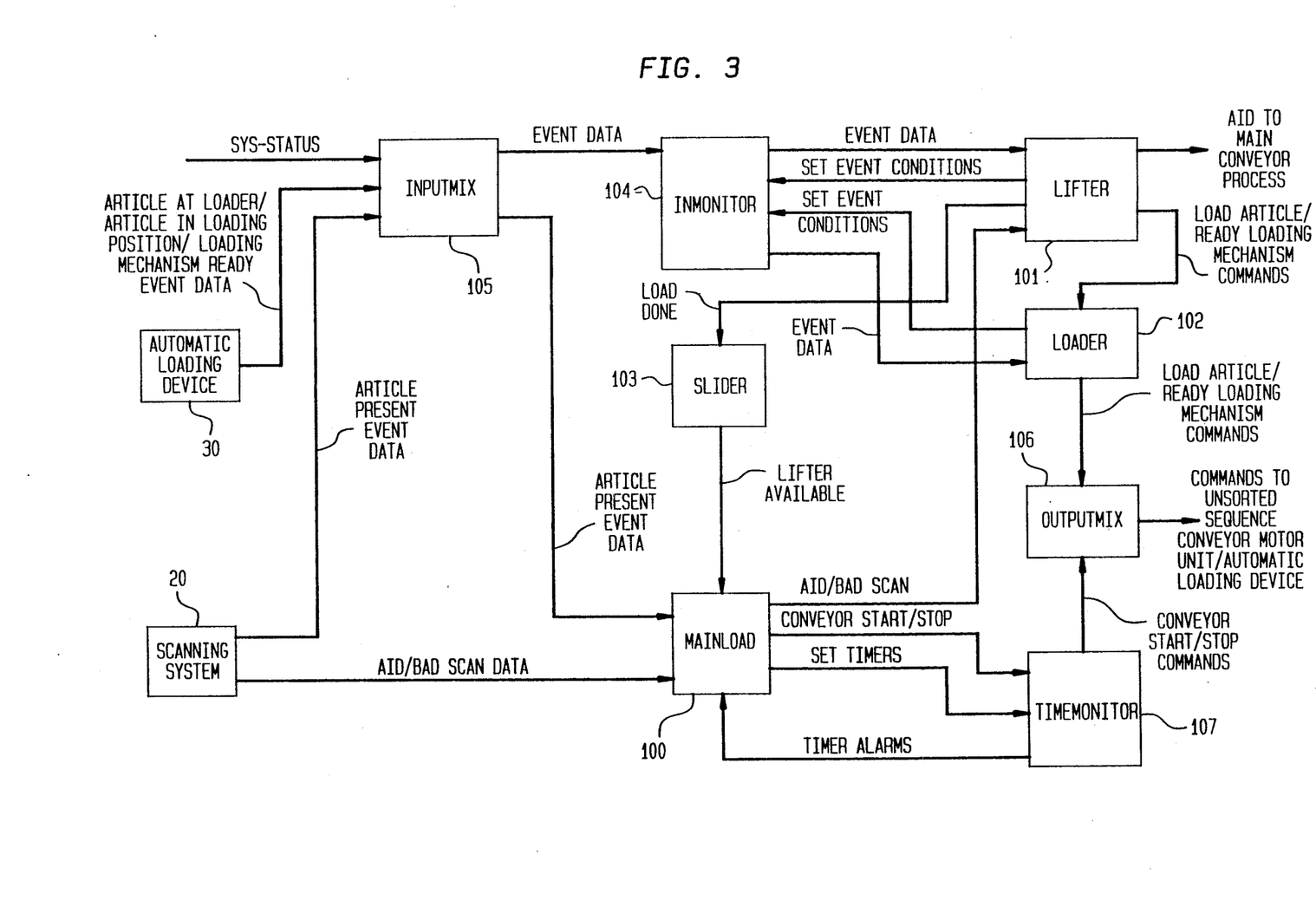
FIG. 3 depicts a data flow structure of an exemplary embodiment of the software processes which control the motor system of the unsorted sequence conveyor and the operation of the automatic loading device.

FIG. 3 shows a data flow structure of an exemplary embodiment of software processes which receive automatic loading device 30 and scanning system 20 event information and data and control the unsorted sequence conveyor motor unit 50 and the automatic loading device 30 of the present invention.

(1) MainLoad The MainLoad process 100 provides high level control of the scanning and loading system. MainLoad receives AID information from the scanning system 20 and, at the appropriate time, passes it on to the Lifter process 101 (see below) for association with an LP address. It also sends CONVEYOR START and CONVEYOR STOP commands to the unsorted sequence conveyor motor unit 50 to control the flow of scanned and loaded articles.

(2) Lifter—The Lifter process 101 provides high level synchronization of the loading of articles, such as the lifting of hangers on which garments are hung onto the sorting conveyor 40. Among other things, it distinguishes between valid AIDs and BAD SCAN data. Distinguishing between valid AIDs and BAD SCAN data prevents unidentified articles and articles that do not belong to the group $ART_1$—$ART_m$ from being loaded. Also, the Lifter process 101 commands the loading of articles by commanding the Loader process 102 (see below).

(3) Loader—The Loader process 102 is responsible for issuing LOAD ARTICLE and READY LOADING MECHANISM commands to the automatic loading device 30 in response to commands from the Lifter 101. As part of this function, the Loader process 102 sets timeout timers for each of these commands and checks for reports of ARTICLE IN LOADING POSITION and LOADING MECHANISM READY events.

(4) Slider—The Slider process 103 is responsible for synchronizing the operation of the MainLoad 100 and Lifter 101 processes in the case of the exemplary unsorted sequence conveyor described in co-pending U.S. Application Ser. No. 07/643,776 entitled "Apparatus For Conveying," referenced above. The Slider 103 prevents the exemplary unsorted sequence conveyor 35 from placing articles for loading on the slick rail faster than the automatic loading device 30 can load them.

(5) InMonitor—The InMonitor process 104 is responsible for monitoring data received from the scanning system 20 and the automatic loading device 30 to detect the occurrence of certain events and keeping time for event timeout purposes. Events which are detected by the InMonitor process 104 include the receipt of ARTICLE AT LOADER, ARTICLE IN LOADING POSITION and LOADING MECHANISM READY events as determined and communicated by the sensors of the automatic loading device 30.

(6) InputMix—The InputMix process 105 is responsible for routing information to various other processes in the control processor 10.

(7) OutputMix—The OutputMix process 106 is responsible for translating high level commands from the Mainload 100 and Loader 102 processes to bit strings for the unsorted sequence conveyor motor unit 50 and the automatic loading device 30, respectively.

(8) TimeMonitor—The TimeMonitor process 107 is used to time the progress of articles on the unsorted sequence conveyor 35. It sets timers under the control of the MainLoad process 100 for each article on the unsorted sequence conveyor 35 and stops and starts such timers with each CONVEYOR STOP and CONVEYOR START command, respectively.

Figure 4:
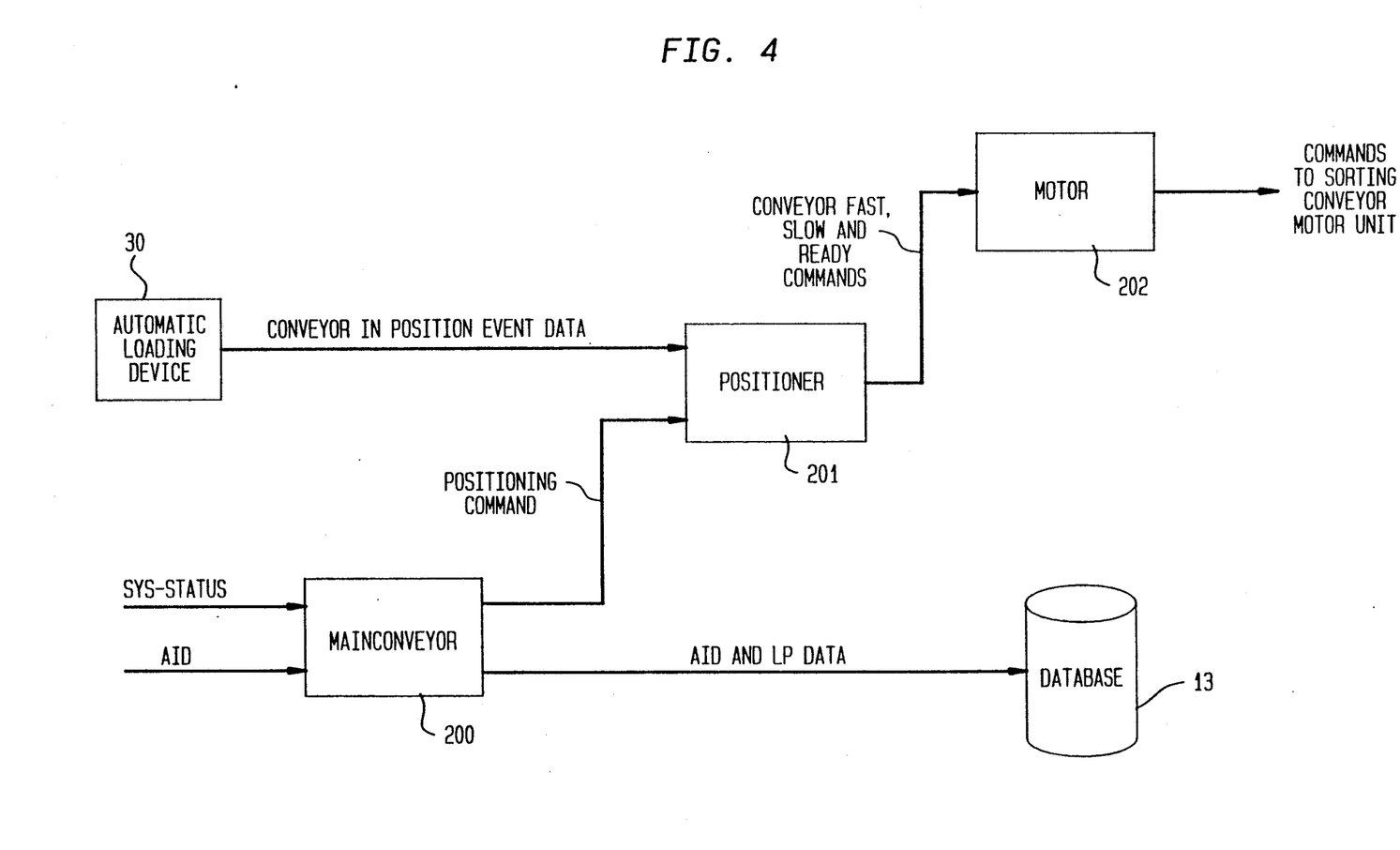
FIG. 4 a data flow structure of an exemplary embodiment of the software processes which control the motor system of the sorting conveyor.

FIG. 4 depicts a data flow structure of an exemplary embodiment of the software processes of the present invention which control the motor system of the sorting conveyor 40.

(1) MainConveyor—The MainConveyor process 200 is responsible for the high level control of the sorting conveyor motor unit 60 and thus the positioning of the sorting conveyor 40. MainConveyor 200 is also responsible for keeping track of which LP address, $LP_j$, is at the automatic loading device 30.

At initialization, signified by the transition of SYSSTATUS from IDLE to LOAD, this process commands the Positioner process 201 (see below) to locate a particular sorting conveyor LP address, e.g. $LP_1$, at the automatic loading device.

After each loading operation, MainConveyor 200 commands the Positioner 201 to index, i.e. move by one LP address, the sorting conveyor 40 for subsequent loading of articles, $ART_1$. MainConveyor 200 also sends $AID_1$ and $LP_j$, associated as a result of the loading process, to memory as part of the database to be used for subsequent sorting.

(2) Positioner—The Positioner process 201 is responsible for positioning the sorting conveyor 40 according to the commands of the MainConveyor process 200. The Positioner 201 breaks down commands from MainConveyor 200 to the required combination of elemental positioning commands understood by the sorting conveyor motor unit 60 (see above).

If MainConveyor 200 commands the positioning of a particular sorting conveyor LP address, e.g., $LP_1$, at the automatic loading device 30, the Positioner 201 first determines whether the distance it must move the sorting conveyor 40 to bring $LP_1$ to the automatic loading device 30 will allow the use of the fast conveyor speed (this decision turns on whether at a fast speed the desired LP address can be approached but not passed before the conveyor can be stopped). If this is the case, the Positioner 201 issues a CONVEYOR FAST command to the sorting conveyor motor unit 60 via the Motor process 202 (discussed below). The Positioner 201 keeps track of LP addresses at the automatic loading device by counting CONVEYOR IN POSITION event messages from the automatic loading device 30. When the desired address, $LP_1$, approaches, the Positioner 201 issues a CONVEYOR SLOW command via the Motor process 202 to move the sorting conveyor 40 at the speed at which it can accurately position $LP_1$ at the automatic loading device 30. The sorting conveyor 40 is stopped by the Positioner 201 issuing a CONVEYOR READY command.

If, on the other hand, the fast conveyor speed cannot be used, the Positioner 201 issues CONVEYOR SLOW and CONVEYOR READY commands to position $LP_1$ at the automatic loading device 30.

If MainConveyor 200 commands the indexing of the sorting conveyor 40, Positioner 201 directs the Motor 202 to issue a CONVEYOR SLOW command to the sorting conveyor motor unit 60. When the Positioner process 201 receives the first CONVEYOR IN POSITION event message from the automatic loading device 30, Positioner 201 directs the Motor 202 to issue a CONVEYOR READY command to halt the sorting conveyor 40. By this sequence, the sorting conveyor 40 is indexed one position.

(3) Motor—The Motor process 202 is responsible for receiving commands from the Positioner process 201 and translating these commands into strings of bits for communication to the sorting conveyor motor unit 60. (See the section on the sorting conveyor motor unit 60 above for a discussion of the command set of the sorting conveyor motor unit 60.)

System Operation

The operation of the present invention is controlled by the various software processes discussed above. In order that all such processes are appraised of current system conditions, the present invention provides a system status message, SYSSTATUS, which carries the mode of system operation to the software processes. The system of the present invention may be in either the IDLE mode or the LOAD mode. In the IDLE mode the present invention is not scanning or loading articles. In the LOAD mode, normal scanning and loading of articles onto the sorting conveyor 40 occurs.

The mode of the present invention is controlled by the system user. The initial mode of the present invention is IDLE. When loading of the sorting conveyor 40 is desired, the user, via terminal 12, places the system in the LOAD mode. Upon receipt of the SYSSTATUS message, the various processes receive the LOAD mode information and commence the loading process.

Once in the LOAD mode, the present invention begins operation by initializing the sorting conveyor 40 such that a first LP address, e.g. $LP_1$, is brought to the automatic loading device 30 to receive the first article to be loaded, $ART_1$. This initialization is accomplished by the MainConveyor 200, Positioner 201, and Motor 202 processes.

Responsive to the transition from the IDLE to the LOAD mode, MainConveyor 200 issues a command to the Positioner 201 to move $LP_1$ to the automatic loading device 30. The Positioner 201 receives this command and, depending upon the distance between the $LP_1$ and the automatic loading device 30 in, e.g., LP address counts, issues CONVEYOR FAST, CONVEYOR SLOW, and CONVEYOR READY commands to the Motor 202. The Motor 202 translates these commands into the appropriate bit strings and communicates them to the sorting conveyor motor unit 60 via the interface processor 11 and the data interconnect 65. While these commands are being issued, the Positioner 201 keeps track of the current LP address at the automatic loading device 30 by counting CONVEYOR IN POSITION events as reported by the automatic loading device 30 and updating the LPAC.

Once $LP_1$ is moved to the automatic loading device 30, the unsorted sequence conveyor 35 is started. The unsorted sequence conveyor 35 is started by the MainLoad process 100 issuing a CONVEYOR START command to the OutputMix process 106. OutputMix 106 translates the CONVEYOR START command to a bit string recognizable by the unsorted sequence conveyor motor unit 50.

As a result of starting the unsorted sequence conveyor 35, articles to be loaded on the sorting conveyor 40 progress toward the automatic loading device 30. In so doing the first article, $ART_1$, is sensed by the scanning system 20, which sends an ARTICLE PRESENT message to the control processor 10 via data interconnect 15 and interface processor 11. In the case of the scanning system shown in FIG. 2, the article is sensed by its blocking the electric eye sensor 21. The ARTICLE PRESENT message is received by the InputMix process 105 and a signal is sent to the MainLoad process 100 indicating that an article is present at the scanning system 20. Responsive to this signal, Mainload 100 starts a first timer in the TimeMonitor process 107 and waits for the AID associated with this first article, $ART_1$, to be communicated from the scanning sensor 22. The purpose of this first timer is to provide a time-out for receipt of AID information from the scanning system 20.

If $AID_1$ of $ART_1$ is not received from the scanning sensor 22 by the time the TimeMonitor 107 informs MainLoad 100, via a timer alarm, that the first timer has timed-out, MainLoad 100 issues a CONVEYOR STOP command to the unsorted sequence conveyor motor unit 50 via the TimeMonitor 107 and OutputMix 106 processes to give the scanning sensor 22 more time to accomplish the scan of the $AID_1$ information. When the scanning sensor 22 sends to MainLoad 100 either an ARTICLE ID message, containing $AID_1$ of $ART_1$, or a BAD SCAN message, MainLoad 100 sends a CONVEYOR START command to the unsorted sequence conveyor motor unit 50 via the TimeMonitor 107 and OutputMix 106 processes to restart the unsorted sequence conveyor 35. Starting the conveyor allows the scanning process to continue for subsequent articles, $ART_2$-$ART_m$. MainLoad also starts a second timer in the TimeMonitor 107. The purpose of this second timer is to allow MainLoad 100 to know approximately when the article will reach the end of the unsorted sequence conveyor 35. Those articles which could not be identified by the scanning sensor 22 must be removed from the unsorted sequence of articles prior to loading. When the second timer kept by TimeMonitor 107 expires, its expiration is reported to MainLoad 100 via a timer alarm. As a result, the AID of the article or the received BAD SCAN message is communicated to the Lifter process 101. Regardless of whether $ART_1$ is successfully scanned, the article continues along the unsorted sequence conveyor 35 toward the automatic loading device 30.

If $ART_1$ was not successfully scanned, $ART_1$ must be removed from the unsorted sequence conveyor 35. This removal can be accomplished in several ways. However, the preferred way is to command the automatic loading device 30 to move its loading mechanism into the loading position prior to the arrival of $ART_1$ at the automatic loading device 30. In this way, $ART_1$ can either bypass the automatic loading device 30, since its movement on the unsorted sequence conveyor 30 is not intercepted by the loading mechanism of the automatic loading device 30, or drop off the end of the unsorted sequence conveyor 35. In either case, $ART_1$ is received in a holding area for articles which could not be scanned by the scanning sensor 22. The loading mechanism of the automatic loading device 30 is placed in the loading position through a command initiated by the Lifter 101. The Lifter 101, in receipt of the BAD SCAN message from MainLoad 100, issues a command to the Loader 102 to issue a LOAD ARTICLE command, via the OutputMix process 106 to the automatic loading device 30. The Lifter 101 also sets a timer which it uses to determine when to issue a command to put the loading mechanism in the ready position. Responsive to the passage of a time period as measured by the timer, the Lifter 101 issues a command to the Loader 102. The Loader 102 in turn issues a READY LOADING MECHANISM command, via OutputMix 106, to the automatic loading device 30 to return the loading mechanism to the position at which it receives articles for loading.

If $ART_1$ was successfully scanned, it is loaded onto the sorting conveyor 40 by the automatic loading device 30. The loading of ART: is accomplished by commands from the Lifter 101 and Loader 102 processes, via the OutputMix process 106, to the automatic loading device 30. The $AID_1$ of the $ART_1$ is passed from the MainLoad process 100 to the Lifter process 101 as discussed above. In response to the receipt of the $AID_1$, the Lifter 101 sets a timeout timer to time the delivery of $ART_1$ to the automatic loading device 30. When $ART_1$ arrives at the automatic loading device 30, the automatic loading device 30 reports this event with an ARTICLE AT LOADER message. This message is received by InputMix 105 and is passed on to InMonitor 104. InMonitor 104 recognizes the message (by virtue of receiving an ARTICLE AT LOADER event condition from the Lifter 1? 1 for which to monitor) and informs the Lifter 101 that a loading operation can occur. The Lifter 101, after waiting a predetermined amount of time to allow the article to settle at the automatic loading device, then commands the Loader 102 to issue a LOAD ARTICLE command to the automatic loading device 30. In response to this command, the automatic loading device 30 places $ART_1$ onto the sorting conveyor 40 at $LP_1$ and sends to the control processor 10 an ARTICLE IN LOADING POSITION event message. The ARTICLE IN LOADING POSITION event message is received by the InputMix 105 and InMonitor 104 processes. InMonitor 104 recognizes this message (by virtue of receiving an ARTICLE AT LOADER event condition from the Loader 102 for which to monitor) and informs the Loader 102. After waiting a predetermined amount of time to allow the automatic loading device hardware to settle, the Loader 102 responds to this event by issuing a READY LOADING MECHANISM command, via OutputMix 106, to the automatic loading device 30. The automatic loading device 30, in response, returns the loading mechanism to its original position where articles are received. This event is reported to the control processor 10 with a LOADING MECHANISM READY event message, which is recognized by the InMonitor 104 by virtue of receiving a LOADING MECHANISM READY event condition from the Loader 102. Upon receipt of the LOADING MECHANISM READY event message by the Loader 102, via the InputMix 105 and InMonitor 104 processes, the physical aspects of the loading process for $ART_1$ are complete.

If the timeout timer set by the Lifter 101 in waiting for $ART_1$ times-out, the system assumes that $ART_1$ was removed from or fell off of the unsorted sequence conveyor 35 and the next article is handled by the system as though the prior article was loaded onto the sorting conveyor 40 successfully.

The process of moving the loading mechanism from its ARTICLE AT LOADER position to its ARTICLE IN LOADING POSITION position and then to its LOADING MECHANISM READY position is performed with timeout timers set and monitored by the software, for example, in the InMonitor process 104. Should any transition of the loading mechanism from one position to another not occur within the given timeout period, an alarm is triggered to call attention to a possible problem with the movement of the loading mechanism or sensors of the automatic loading device 30.

Once $ART_1$ has been loaded onto the sorting conveyor 40 at $LP_1$, data reflecting this event must be recorded in the database of AID's and associated LP's. Also, the sorting conveyor 40 must be advanced so as to bring to the automatic loading device 30 the next available loading point, i.e., $LP_2$. Both these tasks are addressed by the MainConveyor 200, Positioner 201 and Motor 202 processes, as discussed above.

The process described above for $ART_1$ is repeated for each succeeding article in the unsorted sequence until the last article is either loaded onto the sorting conveyor 40 or placed in the "BAD SCAN" collection. In repeating the process described above, a first and second timer is maintained by the TimeMonitor process 107 for each article moving on the unsorted sequence conveyor 35. First and second timers for articles on the conveyor will be stopped by the TimeMonitor 107 any time a CONVEYOR STOP command is issued, e.g., as a result of the failure of the scanning system 20 to scan an article (as measured by a first timer). When the TimeMonitor 107 senses the CONVEYOR STOP command, timekeeping by first and second timers is suspended during the time the unsorted sequence conveyor 35 is stopped. When the TimeMonitor 107 senses a CONVEYOR START command, it restarts the first and second timers for the articles on the unsorted sequence conveyor 35.

In the slick rail embodiment, the Slider process 103 is used to synchronize the operation of the MainLoad 100 and Lifter 101 processes. As such the above described processes are modified as follows. Whenever the Lifter 101 process completes the loading of an article $ART_1$, it sends to the Slider process 103 a message that the loading of the article is done. When this happens, the Slider 103 signals the MainLoad 100 of the availability of the Lifter 101 to load an article.

The slick rail delivers an article to the automatic loading device 30 by force of gravity; once placed on the slick rail, the article slides to the automatic loading device 30. As such, no article can be put on the slick rail unless the automatic loading device 30 is ready to receive an article. Thus, the signal to MainLoad 100 from the Slider 103 is actually informing the MainLoad process 100 that it can place an article on the slick rail without concern that the automatic loading device 30 will not be ready to receive and load the article.

As discussed above, Mainload 100 sets a second timer in the TimeMonitor process 107 to give itself forewarning of an article about to move onto the slick rail. If, prior to the timer timeout, a signal is not received from the Slider 103 informing MainLoad 100 of the availability of the automatic loading device 30 (and thus the slick rail) to receive the next article for loading onto the sorting conveyor 40, MainLoad 100 will direct OutputMix 106 to issue a CONVEYOR STOP command to the unsorted sequence conveyor motor unit 50. By stopping the unsorted sequence conveyor 35, the automatic loading device 30 is afforded the opportunity to catch up by loading the last article deposited on the slick rail from the unsorted sequence conveyor 35. When this "catch up" loading occurs, the automatic loading device 30 will send a LOADING MECHANISM READY event message (ultimately understood by the Slider 103 as a "load done" message from the Lifter 101, and hence understood by the MainLoad process 100 as a "lifter available" message from the Slider 103) that it is ready to receive the next article to be loaded from the unsorted sequence conveyor 35. Responsive to the receipt of this message, MainLoad 100 directs OutputMix 106 to issue a CONVEYOR START command to the unsorted sequence conveyor motor unit 50 to continue the flow of articles for loading (as a result of the issuance of CONVEYOR STOP and CONVEYOR START commands by MainLoad 100, first and second timers maintained by the TimeMonitor 107 are stopped and started, respectively, as discussed above). As such, the Slider 103 and its associated input and output messages prevent the automatic loading device 30 from receiving more articles for loading than it can handle at one time.

We claim:

1. A system for identifying and loading articles comprising:
   one or more articles to be sorted;
   a processor;
   a scanner, coupled to the processor, for identifying to the processor the articles to be sorted;
   a first conveyor for transporting a sequence of articles loaded thereon;
   a loading device, coupled to the processor, for providing to the processor a first signal indicating that the loading device is positioned to receive the one or more articles for loading, for thereafter receiving the one or more articles, for providing to the processor a second signal indicating the receipt of an article by the loading device, for loading the one or more articles to be sorted onto the first conveyor responsive to commands from the processor, the commands being in response to the second signal, and for providing first conveyor position information to the processor;
   such that the processor stores article identification information associated with the position at which the article is loaded on the first conveyor.

2. A system according to claim 1, further comprising a second conveyor, coupled to the processor, for transporting the one or more articles to be sorted to the loading device in response to commands from the processor.

3. A system according to claim 2 wherein the second conveyor comprises a motor unit, coupled to the processor, for receiving commands from the processor and for being responsive thereto to operate the second conveyor.

4. A system according to claim 1 wherein the articles comprise garments supported by hangers.

5. A system according to claim 1 wherein the scanning system comprises a bar code scanner for reading bar coded identification information on articles.

6. A system according to claim 5 wherein the scanning system indicates to the processor the presence of an article to be scanned.

7. A system according to claim 6 wherein the scanning system further comprises an electric eye sensor for indicating to the processor the presence of an article to be scanned.

8. A system according to claim 1 wherein the first conveyor comprises a motor unit, coupled to the processor, for receiving one or more commands from the processor and for being responsive thereto to operate the first conveyor.

9. A system according to claim 8 wherein the motor unit comprises:
   a motor; and
   a clutch, for coupling the motor to the conveyor.

10. A system according to claim 9 wherein the commands received by the motor unit comprise a command which causes the motor to be run at a first speed and the clutch to be engaged such that the first conveyor is caused to move at a speed proportional to the first speed of the motor.

11. A system according to claim 9 wherein the commands received by the motor unit comprise a command which causes the motor to be run at a second speed and the clutch to be engaged such that the first conveyor is caused to move at a speed proportional to the second speed of the motor.

12. A system according to claim 9 wherein the commands received by the motor unit comprise a command which causes the motor to be stopped and the clutch to be released such that the first conveyor is caused to be motionless.

13. A system according to claim 9 wherein the commands received by the motor unit comprise a command which causes the motor to be run at a second speed and the clutch to be released such that the first conveyor is motionless but ready to move at a speed proportional to the second speed of the motor.

14. A system according to claim 1 wherein the loading device further provides to the processor an indication that an article has been placed in a loading position.

15. A system according to claim 1 wherein the loading device comprises a loading mechanism for loading received articles onto the first conveyor and wherein commands from the processor comprise a command to load an article by moving the loading mechanism from a first position to a second position where loading occurs.

16. A system according to claim 14 wherein the loading device comprises a loading mechanism for loading articles onto the first conveyor and wherein commands received from the processor comprise a command to place the loading mechanism in a position where it can receive an article for loading.

17. A system according to claim 15 wherein the loading device further provides to the processor an indication that an article has been placed in a loading position.

18. A system according to claim 1 wherein the loading device comprises a loading mechanism for loading received articles onto the first conveyor 19. A system according to claim 1 wherein the commands received from the processor comprise a command to load an article by moving the loading mechanism from a first position to a second position where loading occurs.

20. A system according to claim 1 wherein the commands received from the processor comprise a command to place the loading mechanism in a position where it can receive an article for loading.

21. A method for identifying and loading articles comprising the steps of:
   transporting a sequence of one or more articles to be sorted;

scanning an article in the sequence with a scanner to determine the identification of the article;

communicating the identification of the scanned article from the scanner to a processor;

storing in memory the article identification;

providing from a loading device to the processor a first signal indicating that the loading device is positioned to receive the one or more articles for loading;

receiving by the loading device the one or more articles, after providing the first signal;

providing from the loading device to the processor a second signal indicating the receipt of an article;

communicating commands from the processor to the loading device to effect the loading of the article onto a first conveyor, the commands being in response to the second signal, the article being loaded at a conveyor location;

communicating conveyor position information from the loading device to the processor;

storing in memory the conveyor location at which an identified article is loaded associated with the stored identification of the article.

22. A method according to claim 31 wherein the step of transporting a sequence of articles comprises conveying the articles on a second conveyor.

23. A method according to claim 22 wherein the step of transporting a sequence of articles comprises communicating commands from the processor to the second conveyor to control such transporting.

24. A method according to claim 21 wherein the articles comprise garments supported by hangers.

25. A method according to claim 21 wherein the step of scanning an article comprises scanning bar coded information on the article.

26. A method according to claim 21 wherein the step of communicating commands from the processor to the loading device comprises communicating a command to load an article.

27. A method according to claim 21 wherein the loading device comprises a loading mechanism and the step of communicating commands from the processor to the loading device comprises communicating a command to move the loading mechanism from a first position to a second position where loading of an article occurs.

28. A method according to claim 21 wherein the loading device comprises a loading mechanism and the step of communicating commands from the processor to the loading device comprises communicating a command to move the loading mechanism to a position where it can receive an article for loading.

29. A method according to claim 21 further comprising the step of communicating commands from the processor to the first conveyor to control first conveyor movement.

30. A method according to claim 21 further comprising the step of communicating from the scanner to the processor information indicating the presence of an article for scanning.

31. A method according to claim 21 wherein the step of communicating commands from the processor to the loading device comprises communicating a command to load an article onto the first conveyor.

32. A method according to claim 21 further comprising the step of communicating from the loading device to the processor information indicating that an article has been loaded.

33. A method according to claim 21 wherein the step of communicating commands from the processor to the loading device comprises communicating a command to ready the loading device to receive an article for loading.

34. A method according to claim 32 wherein the step of communicating commands from the processor to the loading device comprises communicating a command to load an article onto the first conveyor.

35. A method according to claim 34 wherein the step of communicating commands from the processor to the loading device comprises communicating a command to ready the loading device to receive an article for loading.

36. A method according to claim 22 further comprising the steps of:

responsive to the receipt of article identification information from the scanner, timing the movement of an article to determine when the article is nearing the end of the second conveyor; and issuing a command from the processor to the second conveyor to stop the transporting of articles if the loading device does not indicate to the processor that it can receive an article for loading prior to the timer indicating that an article is nearing the end of the second conveyor.

37. A method according to claim 36 further comprising the step of the processor issuing a command to start the second conveyor responsive to the receipt from the loading device of an indication that it can receive an article for loading.

* * * * *